Patented Feb. 6, 1951

2,540,437

UNITED STATES PATENT OFFICE 2,540,437

TREATMENT OF EMULSIONS

Fritz E. Fuchs, Houston, Tex., assignor to Aquanox Corporation, Houston, Tex., a corporation of Texas No Drawing. Application April 27, 1948, Serial No. 23,612

4 Claims. (Cl. 252—358)

This application is a continuation-in-part of my earlier application, Serial No. 785,549, filed November 12, 1947, now Patent No. 2,492,473, granted December 27, 1949.

This invention relates to the treatment of emulsions of mineral oil and water, such as petroleum emulsions, for the purpose of separating the oil from the water.

An object of this invention is to provide a novel process for breaking or separating petroleum emulsions by subjecting such emulsions to the action of a novel demulsifying composition to be described in greater detail hereinafter.

Another object is the provision of a novel demulsifier which is highly effective for breaking or separating petroleum emulsions.

The demulsifier described in the aforementioned application comprised a physical mixture composed of a water-soluble mahogany soap derived from petroleum, an oxidized fatty body, and a compound comprising a polyoxyalkylene derivative of a hexahydric body which has been partially esterified with a long-chain fatty acid. I have now determined that highly efficient demulsifying compositions may also be provided by employing a mixture which includes both the mahogany soaps derived from petroleum and the green acid soaps likewise derived from petroleum along with the other components mentioned in the earlier application. In still another modification, the water-soluble mahogany soaps may be replaced entirely by the green acid soaps.

This invention, therefore, is directed to a demulsifying composition which is a modification of that disclosed in the aforementioned application and comprises a physical mixture composed of petroleum sulfonates, which may be either green acid sulfonates alone or both the water-soluble mahogany and green acid sulphonate soaps derived from petroleum, an oxidized fatty body, and a compound comprising a polyoxyalkylene derivative of a hexahydric body which has been partially esterified with a long-chain fatty acid.

The water-soluble mahogany soaps are well-known, commercially available, materials which are derived from petroleum distillates during conventional treatment thereof by sulfuric acid, the soaps being most often prepared in the form of ammonium, sodium or potassium salts of the mahogany acids. Appropriate methods for the preparation of water-soluble mahogany soaps of the kind contemplated herein are described in detail in U. S. Patents No. 2,317,050 to Goodloe et al. and No. 2,355,778 to Berger et al. In the composition in accordance with this invention, the mahogany soaps employed are those ranging in molecular weight from about 250–500 and preferably those of about 425 molecular weight. The sodium soaps, particularly, of these acids are viscous fluids, reddish-amber to brown in color and readily miscible with the other components of the demulsifying composition contemplated by this invention.

The green acid sulphonate soaps are likewise those commonly obtained from the sulfuric acid treatment of petroleum distillates and are recovered from the acid layer and prepared generally in the form of the ammonium, sodium or potassium salts. In the composition in accordance with this invention, the green sulphonic acids employed are those ranging in molecular weight from about 250–450 and preferably those about 300–350 molecular weight. The ammonium soaps, particularly, of these acids, in the form most generally used, are viscous fluids practically black in color and readily miscible with the other components of the demulsifying composition contemplated by this invention.

The oxidized fatty bodies employed may be characterized as the oxidized derivatives of the unsaturated fatty oils or acids. These include the various blown oils (or their fatty acids), such as blown castor, rapeseed, soya, sesame, fish oils, oleins, and many others derived from vegetable, animal or marine sources. The blown or oxidized fatty oils or fatty acids may be used singly or mixtures of two or more of them may be successfully employed in the composition in accordance with this invention. Cost will normally be the determining factor in the selection of the particular oxidized material which is employed.

The third principal component of the new composition may be characterized as a polyoxyalkylene derivative of a hexahydric body which has been partially esterified with a long-chain fatty acid. More specifically these materials are derived from the various hexahydric alcohols, such as mannitol, sorbitol, and dulcitol, and their anhydrides, which include the sorbitans, sorbides, mannitans and mannides. These hexahydric alcohols or anhydrides are partially esterified with long-chain fatty acids, such as oleic, palmitic, stearic, lauric, abietic, and naphthenic acids to provide partial esters having several free hydroxyl groups on the polyhydric body. These free hydroxyls are then further modified by reaction with alkylene oxide to produce a final compound having both free hydroxyl and ether oxygen substituents which provide the compound with desirable surface active, hydrophilic characteristics. These materials are commercially available under the trade name of "Tweens" and their physical and chemical characteristics are described in a pamphlet, entitled "Atlas Spans and Atlas Tweens," reissued June 1945 by the Atlas Powder Company of Wilmington, Delaware.

In addition to the afore-described principal components of the composition in accordance with this invention, a quantity of a suitable thinning agent is usually added. These agents include such materials as ethyl alcohol, isopropyl alcohol, petroleum naphtha, solvent naphthas derived from coal and wood tar and other similar inert hydrocarbon solvents conventionally used for thinning demulsifying compounds.

Also, the final product may include a suitable agent for neutralizing or saponifying any free acids in the principal composition. Such agents may include the alkali hydroxides, ammonia, or the various basic amines, some examples of which are the mono-, di-, and tri-ethanolamines and their equivalents.

Following are several examples of the method of manufacturing compositions in accordance with this invention.

Example 1

200 pounds of water-soluble mahogany acids of about 425 molecular weight, in the form of the sodium salt, and 140 pounds of green petroleum sulfonic acids of about 300–350 molecular weight, in the form of their ammonium salts, are run into a steam jacketed kettle, equipped with a stirrer and thoroughly mixed, being heated to a temperature of about 140–150° F. The temperature employed is only such as is necessary to thin the materials sufficiently to permit easy stirring and thorough mixing of the ingredients, as no chemical reaction between the mixed materials is sought or is necessary. 60 pounds of commercial pale blown castor oil is then added to the kettle mixture and stirred therewith until a homogeneous mixture is obtained. Then 60 pounds of "Tween 80" is added to the kettle mixture and stirred therewith until it is also completely dissolved. "Tween 80" is the commercial name for the polyoxyalkylene derivative of sorbitan monooleate. The resulting composition is a clear dark brown-to-black colored viscous liquid and constitutes the primary demulsifying composition in accordance with this invention. To thin the mixture to a consistency suitable for easy handling and application to oil field-emulsions, a quantity of an inert hydrocarbon thinner is mixed with the kettle product to dilute it to the desired consistency. In this example, the kettle product was thinned with 250 pounds of a mixture of two or more of the several inert thinners referred to above, to produce the final composition for use in treating petroleum emulsions.

Example 2

To the composition in accordance with Example 1, sufficient strong ammonia (27° Bé.) was added to neutralize any free acidity in the composition. In the case of the Example 1 material, about 2% by weight of the ammonia was sufficient for this purpose. The ammonia is preferably added to the kettle mixture of petroleum sulfonates and blown oil before the addition of the "Tween 80" and the thinner. After suitable stirring to complete the neutralization reaction, the "Tween 80" is added and thoroughly mixed with the neutralized material, following which, a suitable quantity of thinner is added to produce the final demulsifier composition.

Exclusive of the thinner, a typical composition will contain about 85–97% of a mixture of the petroleum sulfonates and blown fatty bodies, the relative proportions of these two classes of materials varying from 10–90% of either one or the other, as desired. As indicated previously the relative proportions of the green acid to mahogany sulfonates may vary from 0–100% of each, that is, the petroleum sulfonate employed may be 100% water-soluble mahogany soap, 100% green acid soap or any mixture thereof. The quantity of "Tween 80" type material will range from 3 to 15% in the mixture of primary ingredients. This mixture of primary ingredients may be thinned by from about 10–50% of one of the classes of thinners mentioned, depending primarily upon the nature of the emulsion to be treated and the treating conditions employed.

A typical final composition in accordance with Example 1 above will contain the several ingredients in approximately the following weight proportions:

| | Per cent |
|---|---|
| Water-soluble mahogany soap | 28.2 |
| Water-soluble green acid soap | 19.8 |
| Pale blown castor oil | 8.5 |
| "Tween 80" | 8.5 |
| Thinner | 35.0 |

A typical composition of the Example 2 type will contain the same ingredients, modified as to proportions to include about 2% by weight of 27° Bé. ammonia.

In practicing the process, a treating agent or demulsifying agent of the kind above described may be brought in contact with the emulsion to be treated in any of the numerous ways now employed in the treatment of petroleum emulsions with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils," the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 10,000 parts of emulsion will usually be found to produce commercially satisfactory results.

What I claim and desire to secure by Letters Patent is:

1. A demulsifier composition for breaking water-in-oil petroleum emulsions consisting essentially of 15 to 3% of a polyoxyalkylene derivative of a hexitol anhydride partially esterified with a long chain fatty acid, and 85 to 97% of a mixture of water-soluble mahogany and green acid soaps and an oxidized fatty body, the proportions of said soaps to said oxidized fatty body in said mixture ranging from 10% of the one to 90% of the other, and the proportion of said mahogany acid soap to said green acid soap being about 10:7.

2. A demulsifier composition for breaking water-in-oil petroleum emulsions consisting essentially of 15 to 3% of a polyoxyalkylene derivative of sorbitan mono-oleate, and 85 to 97% of a mixture of water soluble mahogany and green acid soaps and an oxidized fatty body, the proportion of said soaps to said oxidized fatty body in said mixture ranging from 10% of the one to 90% of the other, and the proportion of said mahogany soap to said green acid soap being about 10:7.

3. A demulsifier composition for breaking water-in-oil petroleum emulsion consisting essentially of 15 to 3% of a polyoxyalkylene derivative of sorbitan mono-oleate, 85 to 97% of a mixture of water soluble mahogany and green acid soaps and blown castor oil, the proportions of said soaps to said blown castor oil in the mixture ranging from 10% of the one to 90% of the other, and the proportion of said mahogany soap to said green acid soap being about 10:7.

4. The process of breaking water-in-oil petroleum emulsions, comprising, subjecting the emulsion to the action of a treating agent consisting essentially of 15 to 3% of a polyoxyalkylene derivative of a hexitol anhydride partially esterified with a long chain fatty acid, and 85 to 97% of a mixture of water soluble mahogany and green acid soaps and an oxidized fatty body, the proportions of said soaps to said oxidized fatty body in said mixture ranging from 10% of the one to 90% of the other, and the proportion of said mahogany soap to said green acid soap being about 10:7.

FRITZ E. FUCHS.

REFERENCES CITED

The following references are of record in the file of this patent:

UNITED STATES PATENTS

| Number | Name | Date |
|---|---|---|
| 1,872,286 | Heckel et al. | Aug. 16, 1932 |
| 1,882,444 | Pierce et al. | Oct. 11, 1932 |
| 1,940,394 | De Groote et al. | Dec. 19, 1933 |
| 1,984,633 | De Groote et al. | Dec. 18, 1934 |
| 2,209,445 | de Mering | July 30, 1940 |
| 2,317,050 | Goodloe et al. | Apr. 20, 1943 |
| 2,354,993 | Harlan | Aug. 1, 1944 |
| 2,355,778 | Berger et al. | Aug. 15, 1944 |
| 2,443,273 | Salathiel | June 15, 1948 |